US008949643B2

(12) United States Patent
Mishra

(10) Patent No.: US 8,949,643 B2
(45) Date of Patent: Feb. 3, 2015

(54) DOCUMENT VALIDATOR WITH POWER MANAGEMENT

(75) Inventor: Varuni Mishra, Malvern, PA (US)

(73) Assignee: MEI, Inc., Malvern, PA (US)

( * ) Notice: Subject to any disclaimer, the term of this patent is extended or adjusted under 35 U.S.C. 154(b) by 515 days.

(21) Appl. No.: 13/255,671

(22) PCT Filed: Mar. 11, 2010

(86) PCT No.: PCT/US2010/026924
§ 371 (c)(1),
(2), (4) Date: Nov. 21, 2011

(87) PCT Pub. No.: WO2010/105022
PCT Pub. Date: Sep. 16, 2010

(65) Prior Publication Data

US 2012/0066533 A1 Mar. 15, 2012

Related U.S. Application Data

(60) Provisional application No. 61/159,374, filed on Mar. 11, 2009.

(51) Int. Cl.
*G06F 1/00* (2006.01)
*G07D 11/00* (2006.01)

(52) U.S. Cl.
CPC ........ *G07D 11/0036* (2013.01); *G07D 11/0081* (2013.01)
USPC .......................................................... 713/323

(58) Field of Classification Search
USPC .......................................................... 713/323
See application file for complete search history.

(56) References Cited

U.S. PATENT DOCUMENTS

| | | | | |
|---|---|---|---|---|
| 5,316,124 | A * | 5/1994 | Barnes et al. | 194/206 |
| 5,657,847 | A | 8/1997 | Tod et al. | |
| 6,243,626 | B1 * | 6/2001 | Schanin | 700/286 |
| 6,581,396 | B2 | 6/2003 | Schanin | |
| 6,991,129 | B2 | 1/2006 | Chien et al. | |
| 7,276,925 | B2 * | 10/2007 | Dobberpuhl et al. | 324/750.3 |
| 2006/0108732 | A1 * | 5/2006 | Kanno et al. | 271/4.03 |

(Continued)

FOREIGN PATENT DOCUMENTS

| | | |
|---|---|---|
| DE | 202008015252 | 2/2009 |
| EP | 1255232 | 11/2002 |
| GB | 2173624 | 10/1986 |

OTHER PUBLICATIONS

International Search Report dated May 21, 2010 for International Application No. PCT/US2010/026924.

*Primary Examiner* — Nimesh G Patel
(74) *Attorney, Agent, or Firm* — Mintz Levin Cohn Ferris Glovsky and Popeo, P.C.

(57) ABSTRACT

The disclosure relates to a device and a method for validating documents of value, especially a low power validator for validating documents of value is described comprising: a processing unit for controlling operation of the validator; an inlet for receiving a document of value from a user; and a power management system for transitioning the validator between a power conserving mode and a normal operating mode, wherein the power management system comprises a wake up unit arranged to monitor the inlet for the presence of a document of value and to monitor the voltage provided from a power source.

45 Claims, 7 Drawing Sheets

(56) References Cited

U.S. PATENT DOCUMENTS

| | | | | |
|---|---|---|---|---|
| 2008/0070652 | A1* | 3/2008 | Nguyen et al. | 463/1 |
| 2008/0109109 | A1* | 5/2008 | Schanin et al. | 700/231 |
| 2008/0222431 | A1* | 9/2008 | Paniagua et al. | 713/300 |
| 2010/0178900 | A1* | 7/2010 | Cheng et al. | 455/414.1 |
| 2010/0285866 | A1* | 11/2010 | Bleich et al. | 463/24 |
| 2011/0217032 | A1* | 9/2011 | Guthrie et al. | 396/205 |
| 2012/0075102 | A1* | 3/2012 | Stewart et al. | 340/572.1 |
| 2013/0040662 | A1* | 2/2013 | Elisco | 455/456.3 |

* cited by examiner

DOCUMENT VALIDATOR WITH POWER MANAGEMENT

CROSS-REFERENCE TO RELATED APPLICATIONS

This application is the U.S. National Stage filing of International Application No. PCT/US2010/026924 filed Mar. 11, 2010, which claims priority to U.S. Provisional Application No. 61/159,374 filed Mar. 11, 2009, each of which is incorporated herein by reference in its entirety.

FIELD OF DISCLOSURE

The disclosure relates to a device for validating documents of value (e.g., paper currency).

BACKGROUND

It is commonly known to those skilled in the art to use a bill validator to check authentication and denomination of banknotes. Bill validators are used in a wide variety of applications including; vending machines, gaming machines, ticketing machines and automated teller machines. Bill validators typically include a sensing unit for sensing authenticity and denomination of inserted banknotes. Various types of sensing systems can be employed by a bill validation device for example, optical sensing, magnetic sensing or a combination of both. Typical bill validation devices have power provided for operation either from the host machine or from a direct power source such as a standard AC power outlet.

A limitation of the type of bill validator described above is that it is in a continuously "ON" mode and thus continually draws power either from the host machine or through a directly connected power source. As overall power consumption for a host machine is becoming more of an issue due to operation costs, there is a need to reduce such consumption.

There exist different solutions to reducing power consumption of a host machine, and this can be accomplished by controlling internal devices and their operation. For example, one solution for a vending machine for dispensing cooled beverages is to control the refrigeration temperatures at different times during the day. Such a solution is disclosed in U.S. Pat. No. 6,581,396.

Other solutions for reducing power consumption of a vending machine are disclosed in U.S. Pat. No. 6,991,129. In yet other solutions, various sub-components (e.g., bill validator) are cycled between an "ON" mode and an "OFF" mode in order to reduce that overall amount of power being consumed by the host machine.

SUMMARY

A low power validator for validating documents of value is described in claim 1. A method for controlling the operation of a low power validator is described in claim 16. Examples are described in the dependent claims.

DETAILED DESCRIPTION OF THE DISCLOSURE

Figure 1:
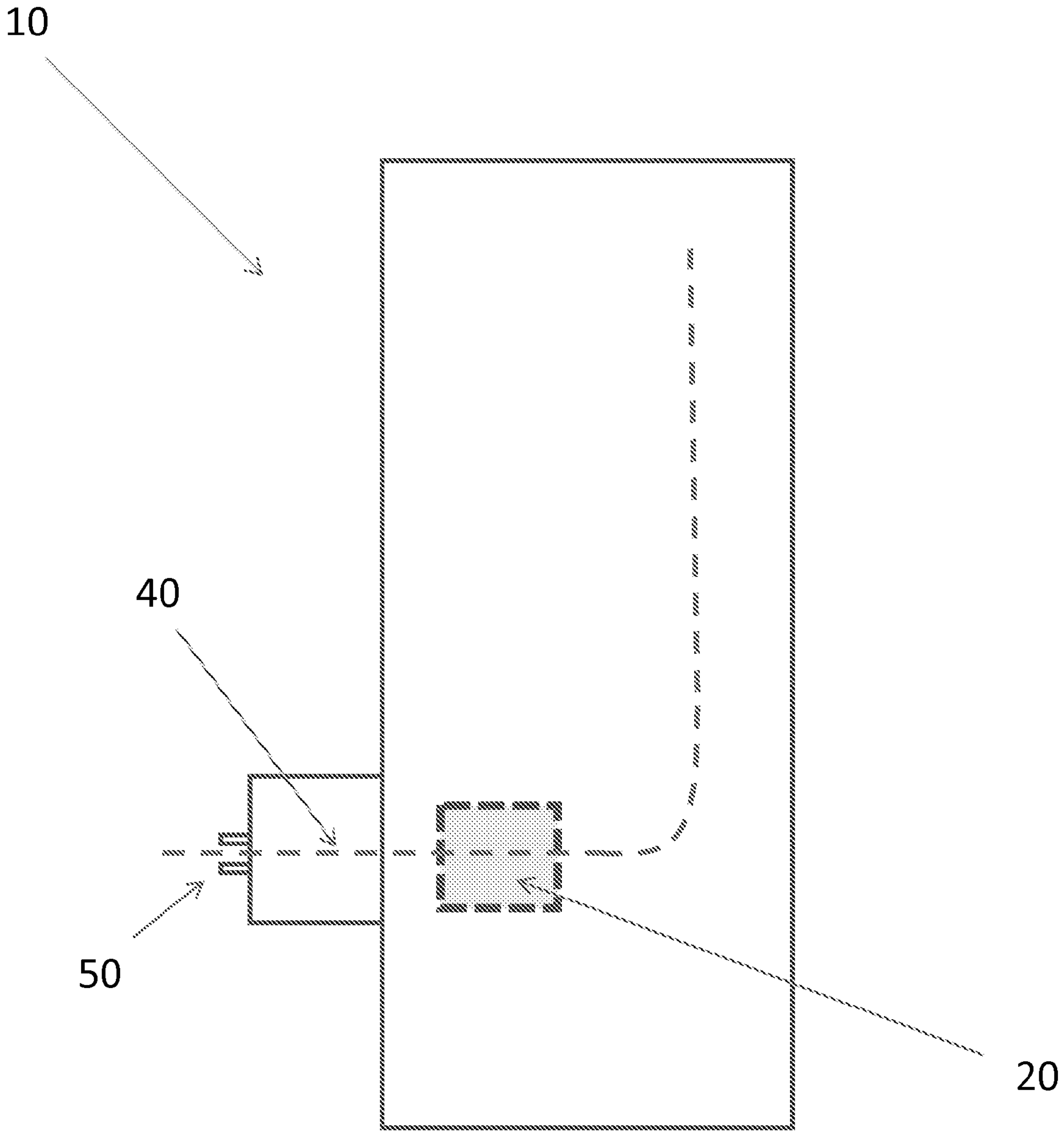
FIG. 1 illustrates an example of a banknote validator and various components.
Figure 2:
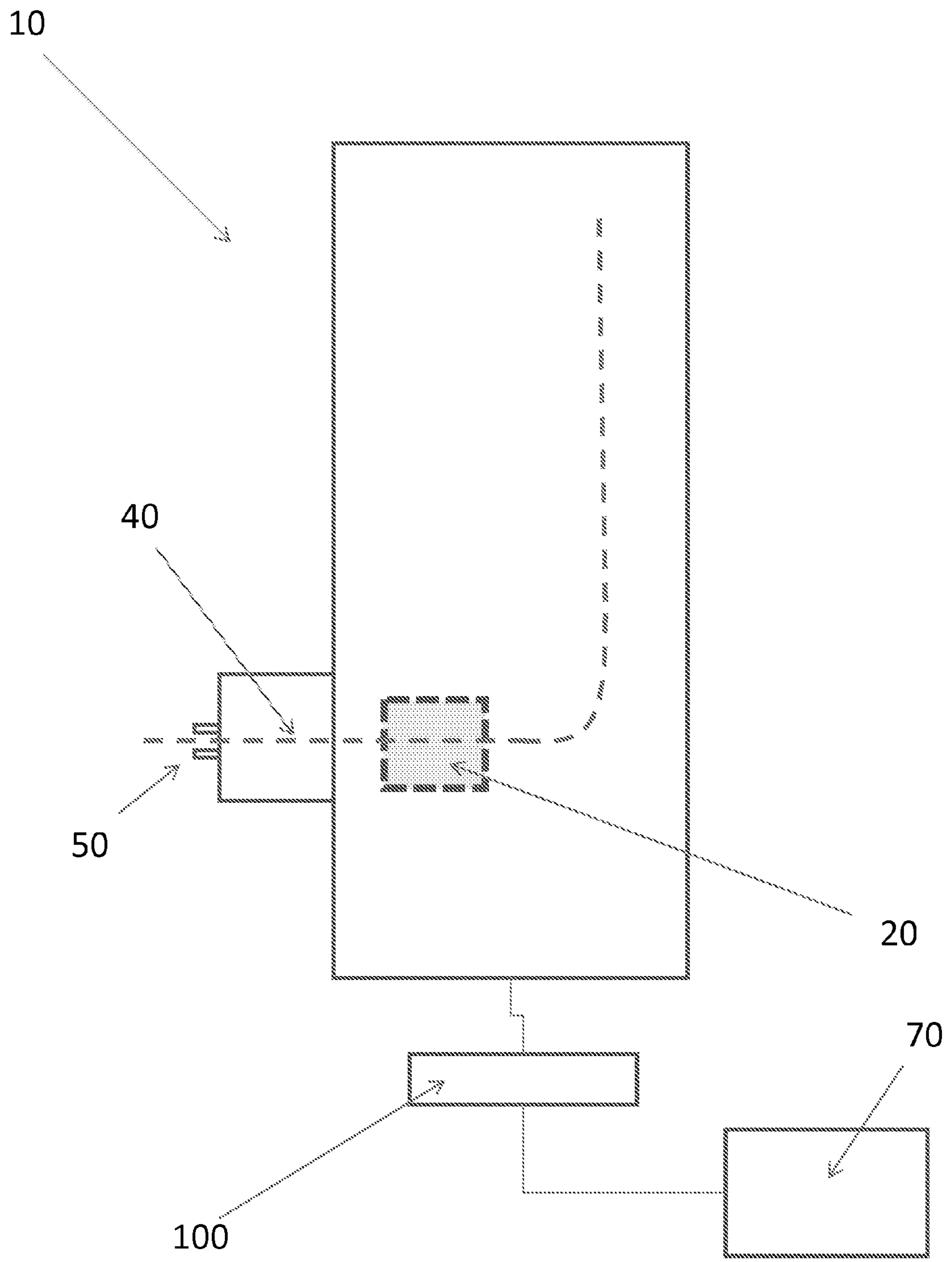
FIG. 2 illustrates an example of a banknote validator including a power management system and a power source.
Figure 3:
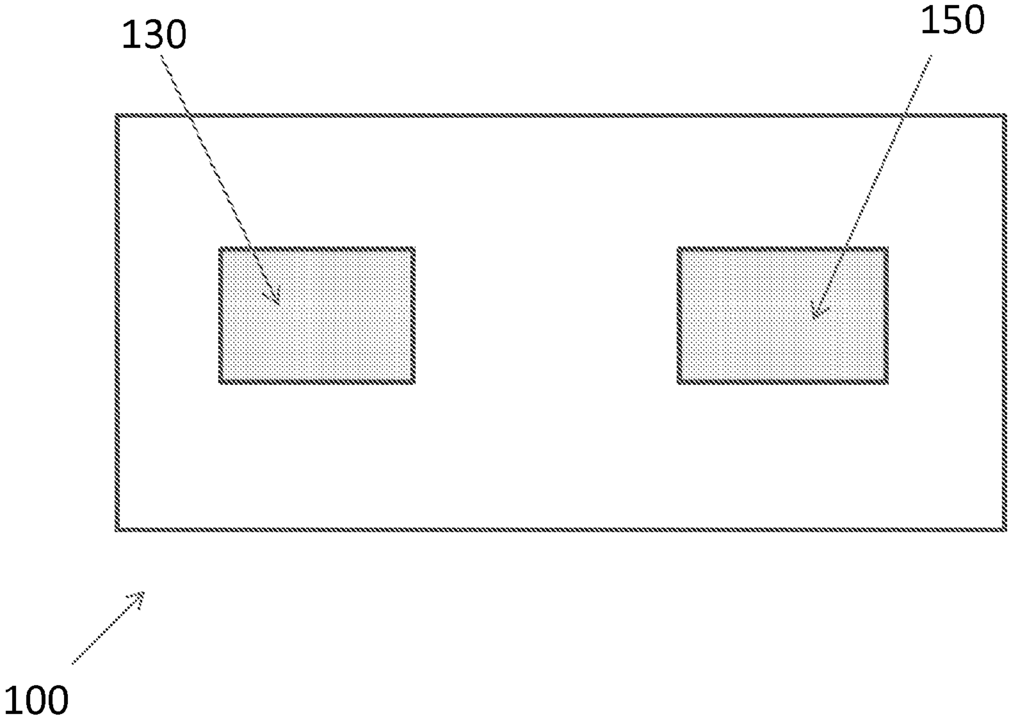
FIG. 3 illustrates an example of a power management system including a wake up unit and power detecting unit.

The disclosure relates to a low power validator for documents of value (e.g., paper currency validator) and, in particular, to a battery powered banknote validator including a power management system for minimizing or reducing the power consumption from a power source. As used herein, the term "documents of value" includes paper currency such as banknotes and bills, as well as security documents, paper coupons and other similar documents of value (both authentic as well as unauthentic (e.g., forgeries).

In the illustrated implementation, a banknote validation device 10 includes an inlet 50 for receiving banknotes from a user, a transportation path 40 for conveying an inserted banknote within the bill validation device, a sensing unit 20 for sensing characteristics of an inserted banknote, and a processing unit for controlling the overall operation of the banknote validator. The sensing unit 20 and other components can be integrated, for example, within the processing unit. Additionally, there is provided with banknote validator 10 a power supply unit 70 and a power management system 100. In some implementations, power supply unit 70 is a 12-volt battery; however, other types of power supplies and voltages can be used for the power supply unit.

Power management system 100 provides control of the supply power being fed to the banknote validator. More specifically, power management system 100 controls the transfer of the banknote validator from a power saving mode to a normal operation mode. In the power saving mode, overall banknote validation system 10 draws a very low amount of power from the power supply unit. In the normal operating mode, overall banknote validation system 10 draws a normal amount of power consistent with typical banknote validator operation. In some implementations, power management system 100 is located between power supply unit 70 and banknote validator 10. In other implementations, power management system 100 is integrated within banknote validator 10.

Figure 4:
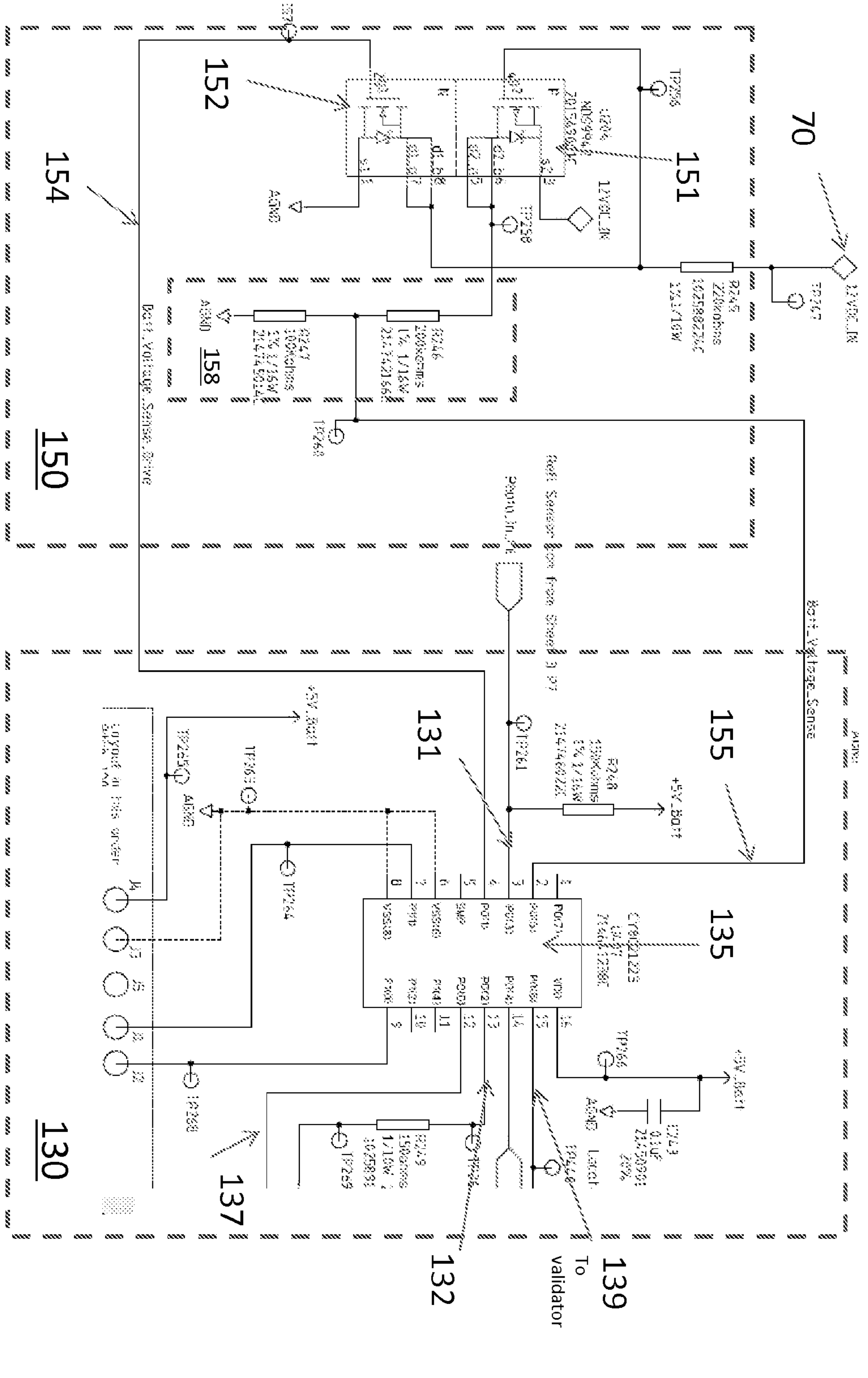
FIG. 4 is an example of a schematic layout drawing of the wake up unit and power detection unit interconnected.

In some implementations, power management system 100 includes a wake up unit 130 and a power detection unit 150. Wake up unit 130 includes a micro-controller 135 (e.g., a programmable system on chip or PSoC device) operatively connected to power source 70, power detection unit 150, and banknote validator 10. In the implementation illustrated in FIG. 4, micro-controller 135 is a PSoC device. FIG. 4 shows the interconnection of wake up unit 130, power detection unit 150 and banknote validator 10.

Figure 5A:
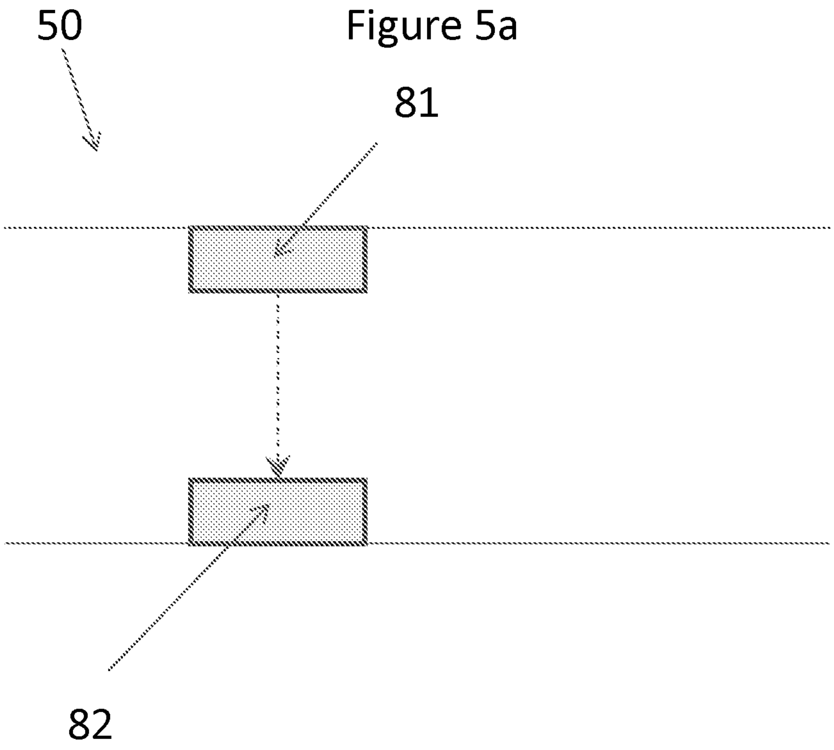
FIG. 5*a* illustrates an example of the banknote presence detection components located in the banknote validation unit inlet without a banknote present.
Figure 5B:
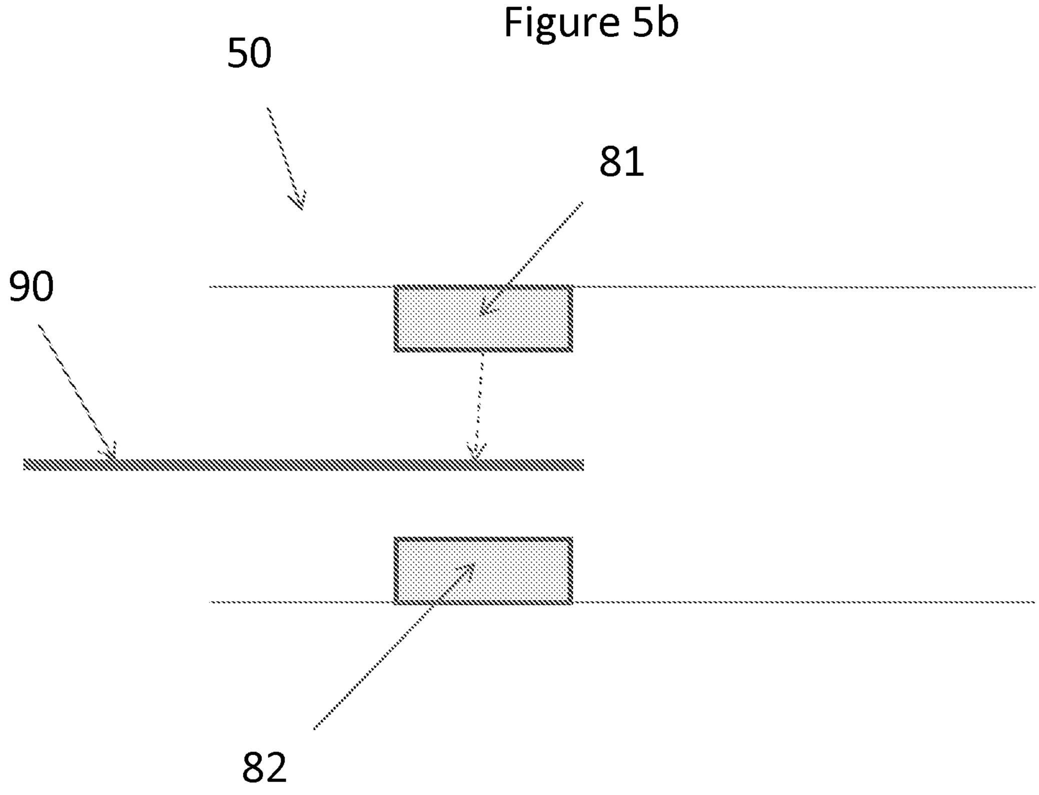
FIG. 5*b* illustrates an example of the banknote presence detection components located in the banknote validation unit inlet with a banknote present.
Figure 5C:
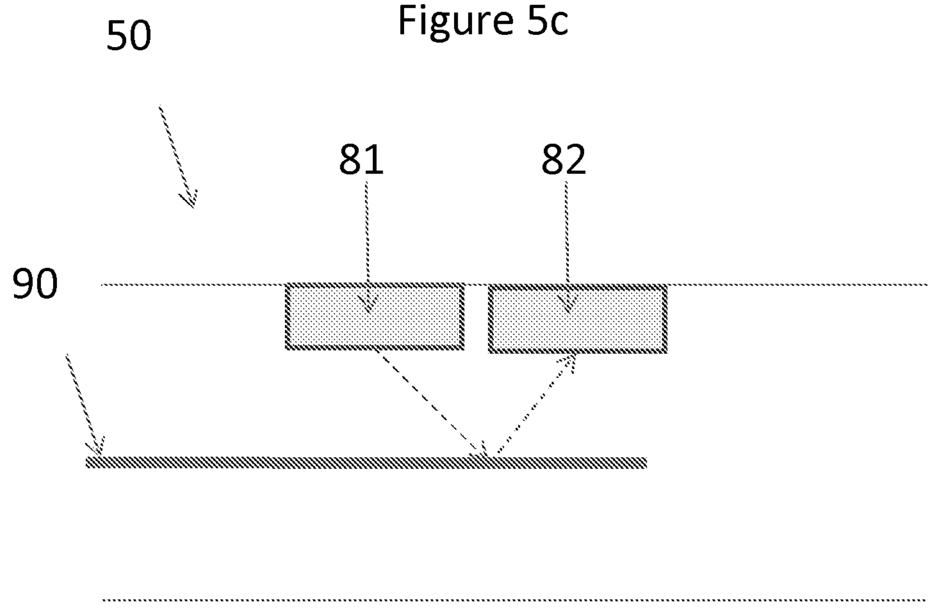
FIG. 5*c* illustrates an example of the banknote presence detection components using a reflective type sensing configuration.
Figure 6:
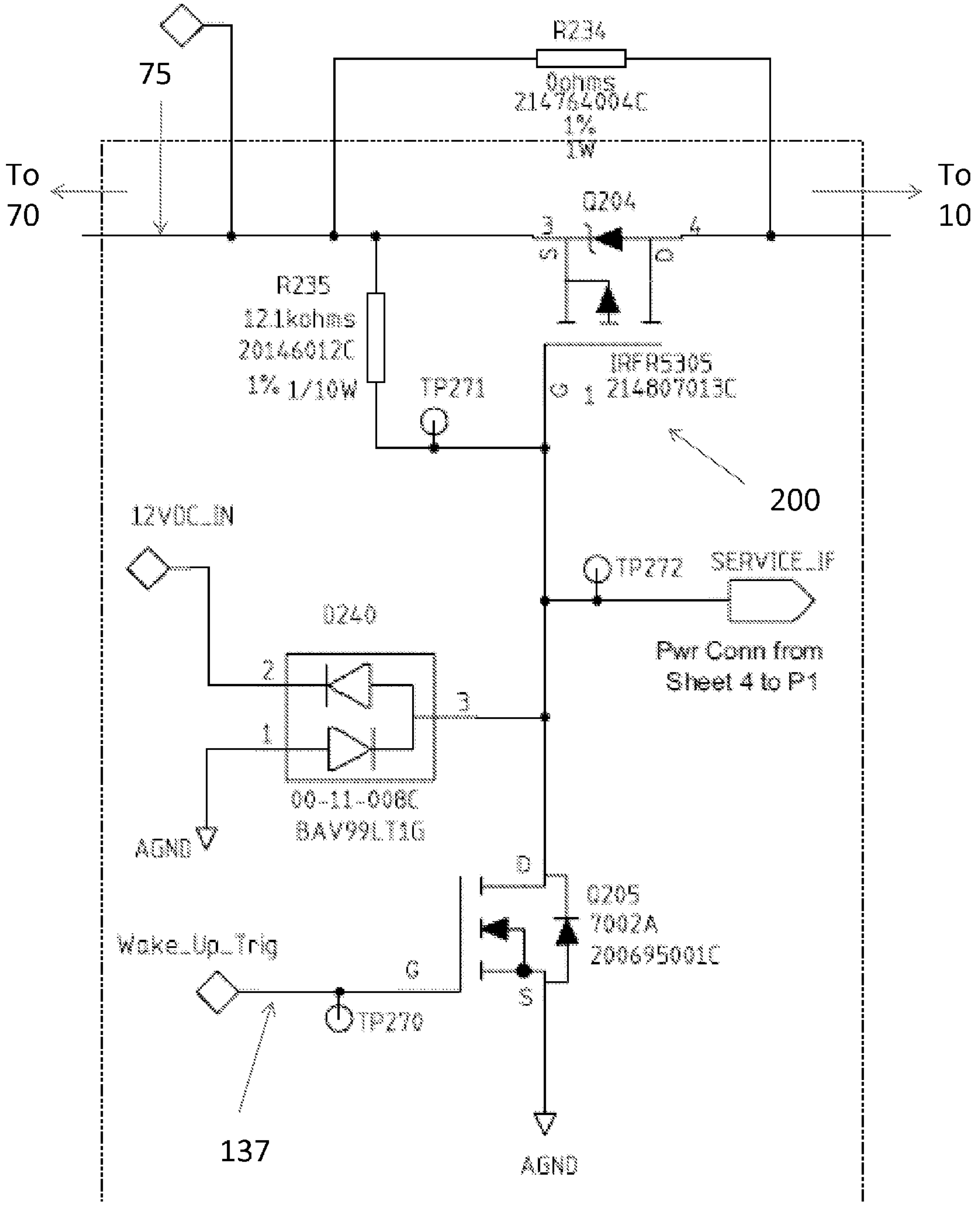
FIG. 6 is an example of a schematic layout of a field effect transistor (FET) used to selectively connect the power supply with the banknote validator.

When validator 10 is in the power saving mode, FET 200 is in a disable mode so as to not provide main power to validator 10 via line 75. FET 200 is forced to a disable mode removing the connection of main power line 75 with validator 10 when output line 137 from microcontroller 135 becomes low. Continuing in the power saving state, wake up circuit 130 regularly monitors inlet 50 of banknote validator 10 for the presence of a banknote. The monitoring of inlet 50 for a banknote can be done in various ways known in the art, but for the example in FIGS. 5*a* and 5*b* is implemented as a paired photo-emitter 81 and photo-detector 82 arranged on either side of bill path 40. Emitter 81 continuously emits (e.g., infrared light) across the transportation path 40 of inlet 50 such that when no banknote is present, the emitted light from emitter 81 is received by detector 82. When detector 82 receives light from emitter 81 a banknote is not present and, therefore, measuring the signal presence of detector 82 allows for determining there is no banknote present in inlet 50 of banknote validator 10. Conversely (as shown in FIG. 5*b*), if light emitted from emitter 81 is not received by detector 82, measuring the response signal of detector 92 allows for a determination of the presence of a banknote 90 in inlet 50.

In other implementations, a reflective object sensor configuration can be used to detect the presence of banknote 90 in inlet 50. In such an implementation, emitter 81 and detector 82 are located on the same side of banknote path 40. In this implementation, the presence of a banknote causes the light emitted from emitter 81 to be reflected by banknote 90 and thus received by detector 82. Having a signal received by detector 82 allows for the measurement of the response signal of detector 82 to determine the presence of a banknote in inlet 50 as previously described.

Wake up unit 130 controls the banknote detection operation by driving emitter 81 (e.g., at a frequency of 10 Hz) and regularly samples (e.g., every 100 ms) for a received signal by detector 82 to determine if a banknote has been inserted in to inlet 50 by a user via lines 132, 131 respectively. When micro-controller 135 detects a banknote in inlet 50 via line 131, wake up unit 130 drives power detection unit 150 to determine if there is enough power to transfer banknote validator 10 from the power conserving mode to the normal operation mode.

To evaluate the power available for operation, upon detecting a banknote in inlet 50, wake up unit 130 enables a drive signal (i.e., 5V) via line 154 to N-FET 152. Receipt of a drive signal from microcontroller 135 via line 154 by N-FET 152 causes a 0V to be received by P-FET 151 and thus enable voltage to supplied to voltage divider 158 from power supply 70. Voltage divider 158 includes two resistors R1 and R2 to prevent excess voltage to be sensed by microcontroller 135 via line 155. In the illustrated implementation, when microcontroller 135 is a PSoC device and power supply 70 is a 12V DC source, the voltage divider results is a one-third voltage reduction to comply with typical PSoC requirements.

In an implementation where power supply 70 is a 12-volt DC source, microcontroller 135 evaluates the voltage measured over line 155 and will provide an enable signal to output line 137. An enable signal on line 137 from microcontroller 135 causes FET 200 to provide a connection of main power line 75 of banknote validator 10 to power supply 70 effectively transferring banknote validator 10 from a power conserving mode to a normal operation mode.

In some implementations, there is provided a voltage regulator between power source 70 and banknote validator 10 so as to provide a relatively constant voltage for operating banknote validator 10.

Once operation of the banknote validator 10 has been transferred from the power conserving mode to the normal operation mode, the inserted banknote can be evaluated by validator 10. During normal operation mode, an inserted banknote 90 in transported from inlet 50 by along a transportation path 40 to sensing unit 20. Sensing unit 20 authenticate and/or denominates the inserted banknote and rejects non-valid banknotes back to the user by reversing the transportation mechanism of transportation path 40 so as to return the non-valid banknote through inlet 50.

During operation of banknote validator 10 in the normal operation mode, the controller of banknote validator determines when to place the system back into the power conserving mode. The system will enter the power conserving mode, for example, when one of two situations exist. One situation that allows banknote validator 10 to transfer from the normal operating mode to the power conserving mode occurs when the banknote validator controller sends a control signal to wake up unit 130 via line 139. When microcontroller 135 receives a signal from the banknote validator controller to enter the power conserving mode, microcontroller 135 sends a disable signal via line 137 to FET 200 to disconnect power source 70 from banknote validator 10. A disable signal received by FET 200 effectively disconnects line 75 from power source 70 and banknote validator 10.

A second situation that allows banknote validator 10 to transfer from the normal operating mode to the power conserving mode occurs when power source 70 is unable to provide enough power to banknote validator 10. Such a situation can arise, for example, if the voltage being sensed via line 155 falls below a predetermined threshold. Since microcontroller 135 is continuously monitoring the voltage sensed on line 155 during the normal operation mode, any drop in measured voltage of power source 70 below a predetermined threshold will cause microcontroller 135 to send a disable signal via line 137 to FET 200, thereby disconnecting power source 70 from banknote validator 10.

An advantage of the power management system 100 is that although banknote validator 10 cannot be transitioned from the power conserving mode to the normal operating mode when the measured voltage of power source 70 is below a predetermined threshold, if a re-charging or increase to the power source 70 voltage occurs, banknote validator 10 is able to transition at a later time between modes without having to be reset by a service person. More particularly, if the voltage of power source 70 is below a predetermined threshold, the banknote validator will remain in a power conserving mode until the voltage of power source 70 rises above the predetermined threshold, and there is no need to have to reset the system.

Other variations are within the scope of the disclosure and claims. Various aspects are set forth in the claims.

What is claimed is:

1. A low power validator for validating documents of value comprising:

a processing unit for controlling operation of the validator;

an inlet for receiving a document of value from a user; and a power management system for transitioning the validator between a power conserving mode and a normal operating mode, wherein the power management system comprises a wake up unit arranged to monitor the inlet for the presence of a document of value and to monitor a voltage provided from a power source, the power management system adapted such that the validator can be transitioned from the power conserving mode to the normal operating mode without having to be reset after the voltage provided from the power source was measured to be below a predetermined threshold;

wherein the validator is arranged to transition from the normal operating mode to the power conserving mode when the monitored voltage provided from the power source falls below the predetermined threshold and based on receipt of an instruction signal by the wakeup unit;

wherein the validator is arranged to transition from the power conserving mode to the normal operating mode when the wake up unit detects the presence of a document of value in the inlet and the voltage provided from the power source is measured to be above the predetermined threshold.

2. The low power validator according to claim 1 further comprising a power detection unit operatively coupled to the wake up unit to provide a measurement of the power source upon receiving a driving signal from the wake up unit.

3. The low power validator according to claim 2, wherein the power detection unit further comprises a voltage divider and adapted to measure the voltage provided from the power source using the voltage divider.

4. The low power validator according to claim 1, wherein the wake up unit includes a micro-processor.

5. The low power validator according to claim 4, wherein a voltage divider is designed and arranged to prevent excess voltage to be sensed by the micro-processor.

6. The low power validator according to claim 4, wherein the micro-processor is arranged to, when the voltage provided from the power source is measured to be above the predetermined threshold and when the wake up unit detects the presence of a document of value in the inlet, provide an enable signal to a switch such that the validator is transitioned from the power conserving mode to the normal operating mode.

7. The low power validator according to claim 6, wherein the switch comprises a P-FET, especially the switch comprises a P-FET and an N-FET wherein the enable signal is provided to a gate terminal of the N-FET, a source terminal of the N-FET is connected to ground, a drain terminal of the N-FET is connected to a gate terminal of the P-FET, a source terminal of the P-FET is connected to the power source and a drain terminal of the P-FET is connected to a sensing unit of the validator.

8. The low power validator according to claim 1, wherein the validator further comprises a photo-emitter and a photo-detector arranged to detect the presence of a document of value in the inlet.

9. The low power validator according to claim 8, wherein the photo-emitter and the photo-detector are arranged on opposite sides of a path of a document of value in the inlet or on the same side of the path.

10. The low power validator according to claim 1 wherein the power source is a 12-volt DC battery.

11. The low power validator according to claim 1 wherein the processing unit includes a microprocessor.

12. The low power validator according to claim 11 wherein the validator is arranged to transition from a normal operating mode to a power conserving mode upon receipt of an instruction signal from the validator microprocessor by the wake up unit.

13. The low power validator according to claim 11, wherein the microprocessor continuously monitors the voltage provided from the power source during normal operating mode.

14. A method for controlling the operation of a low power validator for validating documents of value comprising:

controlling the operation of the validator using a processing unit for receiving a document of value from a user by an inlet; and transitioning the validator between a power conserving mode and a normal operating mode using a power management system, wherein the inlet is monitored for the presence of a document of value, a voltage provided from a power source is monitored using a wake up unit comprised in the power management system, the validator transitions from the power conserving mode to the normal operating mode when the wake up unit detects the presence of a document of value in the inlet and the voltage provided from the power source is measured to be above a predetermined threshold, and the validator can be transitioned from the power conserving mode to the normal operating mode without having to be reset after the voltage provided from the power source was measured to be below the predetermined threshold;

wherein the validator is transitioned from the normal operating mode to the power conserving mode when the monitored voltage provided from the power source falls below the predetermined threshold and based on receipt of an instruction signal by the wakeup unit.

15. The method according to claim 14, wherein the power source is measured, upon receiving a driving signal from the wake up unit, by a power detection unit operatively coupled to the wake up unit.

16. The method according to any or the claims 15, wherein the power detection unit further comprises a voltage divider and the power detection unit is adapted to measure the voltage provided from the power source using the voltage divider.

17. The method according to claim 16, wherein excess voltage to be sensed by a micro-processor included in the wake up unit is prevented by the voltage divider.

18. The method according to claim 17, wherein, when the voltage provided from the power source is measured to be above the predetermined threshold and when the wake up unit detects the presence of a document of value in the inlet, the micro-processor is arranged provides an enable signal to a switch such that the validator is transitioned from the power conserving mode to the normal operating mode.

19. The method according to claim 18, wherein the switch comprises a P-FET, especially the switch comprises a P-FET and an N-FET wherein the enable signal is provided to a gate terminal of the N-FET, a source terminal of the N-FET is connected to ground, a drain terminal of the N-FET is connected to a gate terminal of the P-FET, a source terminal of the P-FET is connected to the power source and a drain terminal of the P-FET is connected to a sensing unit of the validator.

20. The method according to claim 14, wherein the presence of a document of value in the inlet is detected using a photo-emitter and a photo-detector.

21. The method according to claim 14, wherein voltage provided by the power source is provided by a 12-volt DC battery.

22. The method according to claim 14, using a microprocessor in the processing unit.

23. The method according to claim 22, wherein the validator is transitioned from a normal operating mode to a power conserving mode upon receipt of an instruction signal from the validator microprocessor by the wake up unit.

24. The method according to claim 22, wherein the microprocessor continuously monitors the voltage provided from the power source during normal operating mode.

25. A low power validator for validating documents of value comprising:

a processing unit for controlling operation of the validator;

an inlet for receiving a document of value from a user; and a power management system for transitioning the validator between a power conserving mode and a normal operating mode, wherein the power management system comprises a wake up unit arranged to monitor the inlet for the presence of a document of value and to monitor a voltage provided from a power source;

wherein the validator is arranged to transition from the normal operating mode to the power conserving mode based on receipt of an instruction signal from a validator microprocessor by the wake up unit and when the monitored voltage provided from the power source falls below a predetermined threshold;

wherein the validator is arranged to transition from the power conserving mode to the normal operating mode when the wake up unit detects the presence of a document of value in the inlet and the voltage provided from the power source is measured to be above the predetermined threshold and the power management system is adapted such that the validator can be transitioned from the power conserving mode to the normal operating mode without having to be reset after the voltage provided from the power source was measured to be below the predetermined threshold.

26. The low power validator according to claim 25 further comprising a power detection unit operatively coupled to the wake up unit to provide a measurement of the power source upon receiving a driving signal from the wake up unit.

27. The low power validator according to claim 26, wherein the power detection unit further comprises a voltage divider and adapted to measure the voltage provided from the power source using the voltage divider.

28. The low power validator according to claim 25, wherein the wake up unit includes a micro-processor.

29. The low power validator according to claim 28, wherein a voltage divider is designed and arranged to prevent excess voltage to be sensed by the micro-processor.

30. The low power validator according to claim 28, wherein the micro-processor is arranged to, when the voltage provided from the power source is measured to be above the predetermined threshold and when the wake up unit detects the presence of a document of value in the inlet, provide an enable signal to a switch such that the validator is transitioned from the power conserving mode to the normal operating mode.

31. The low power validator according to claim 30, wherein the switch comprises a P-FET, especially the switch comprises a P-FET and an N-FET wherein the enable signal is provided to a gate terminal of the N-FET, a source terminal of the N-FET is connected to ground, a drain terminal of the N-FET is connected to a gate terminal of the P-FET, a source terminal of the P-FET is connected to the power source and a drain terminal of the P-FET is connected to a sensing unit of the validator.

32. The low power validator according to claim 25, wherein the validator further comprises a photo-emitter and a photo-detector arranged to detect the presence of a document of value in the inlet.

33. The low power validator according to claim 32, wherein the photo-emitter and the photo-detector are arranged on opposite sides of a path of a document of value in the inlet or on the same side of the path.

34. The low power validator according to claim 25 wherein the power source is a 12-volt DC battery.

35. The low power validator according to claim 25 wherein the processing unit includes a microprocessor.

36. A method for controlling the operation of a low power validator for validating documents of value comprising:

controlling the operation of the validator using a processing unit for receiving a document of value from a user by an inlet;

transitioning the validator from a normal operating mode and a power conserving mode using a power management system upon receipt of an instruction signal from a validator microprocessor by a wake up unit and when a voltage provided from a power source falls below a predetermined threshold, wherein the inlet is monitored for the presence of a document of value, and wherein the voltage provided from the power source is monitored using the wake up unit comprised in the power management system, wherein the validator transitions from the power conserving mode to the normal operating mode when the wake up unit detects the presence of a document of value in the inlet and the voltage provided from the power source is measured to be above the predetermined threshold and the validator can be transitioned from the power conserving mode to the normal operating mode without having to be reset after the voltage provided from the power source was measured to be below the predetermined threshold.

37. The method according to claim 36, wherein the power source is measured, upon receiving a driving signal from the wake up unit, by a power detection unit operatively coupled to the wake up unit.

38. The method according to any or the claims 37, wherein the power detection unit further comprises a voltage divider and the power detection unit is adapted to measure the voltage provided from the power source using the voltage divider.

39. The method according to claim 38, wherein excess voltage to be sensed by a micro-processor included in the wake up unit is prevented by the voltage divider.

40. The method according to claim 39, wherein, when the voltage provided from the power source is measured to be above the predetermined threshold and when the wake up unit detects the presence of a document of value in the inlet, the micro-processor is arranged to provide an enable signal to a switch such that the validator is transitioned from the power conserving mode to the normal operating mode.

41. The method according to claim 40, wherein the switch comprises a P-FET, especially the switch comprises a P-FET and an N-FET wherein the enable signal is provided to a gate terminal of the N-FET, a source terminal of the N-FET is connected to ground, a drain terminal of the N-FET is connected to a gate terminal of the P-FET, a source terminal of the P-FET is connected to the power source and a drain terminal of the P-FET is connected to a sensing unit of the validator.

42. The method according to claim 36, wherein the presence of a document of value in the inlet is detected using a photo-emitter and a photo-detector.

43. The method according to claim 36, wherein voltage provided by the power source is provided by a 12-volt DC battery.

44. The method according to claim 36, using a microprocessor in the processing unit.

45. The method according to claim 44, wherein the microprocessor continuously monitors the voltage provided from the power source during normal operating mode.

* * * * *